(12) United States Patent
Lehmann et al.

(10) Patent No.: US 11,885,462 B2
(45) Date of Patent: Jan. 30, 2024

(54) ATOMIZER UNIT (71) Applicant: Broetje-Automation GmbH, Rastede (DE)

(72) Inventors: Marc Lehmann, Westerstede (DE); Henning Frers, Wiefelstede (DE)

(73) Assignee: Broetje-Automation GmbH, Rastede (DE)

( * ) Notice: Subject to any disclaimer, the term of this patent is extended or adjusted under 35 U.S.C. 154(b) by 47 days.

(21) Appl. No.: 17/775,073

(22) PCT Filed: Oct. 13, 2020

(86) PCT No.: PCT/EP2020/078788
§ 371 (c)(1),
(2) Date: May 6, 2022

(87) PCT Pub. No.: WO2021/089280
PCT Pub. Date: May 14, 2021

(65) Prior Publication Data
US 2022/0390067 A1    Dec. 8, 2022

(30) Foreign Application Priority Data

Nov. 7, 2019   (DE) .................. 10 2019 130 112.2

(51) Int. Cl.
*F16N 7/34*       (2006.01)
*B05B 1/24*       (2006.01)
(Continued)

(52) U.S. Cl.
CPC .................. *F16N 7/34* (2013.01); *B05B 1/24* (2013.01); *B05B 1/302* (2013.01); *B05B 7/0012* (2013.01);
(Continued)

(58) Field of Classification Search
CPC .. F16N 7/34; B05B 1/24; B05B 1/302; B05B 7/0012; B05B 7/0475; B05B 1/083; B23Q 11/1046; B23Q 11/1076; Y02P 70/10
See application file for complete search history.

(56) References Cited

U.S. PATENT DOCUMENTS 2,969,748 A * 1/1961 Staats ..................... F04F 5/461
417/186
3,478,843 A   11/1969 Eckardt
(Continued)

FOREIGN PATENT DOCUMENTS

DE    19721650 A1 * 11/1998 .......... B01F 3/04049
DE    19738832          3/1999
(Continued)

OTHER PUBLICATIONS

"German Search Report," for German Patent Application No. 102019130112.2 dated Nov. 12, 2020 (4 pages).
(Continued)

*Primary Examiner* — Michael A Riegelman
(74) *Attorney, Agent, or Firm* — Pauly, DeVries Smith & Deffner LLC (57) ABSTRACT

Embodiments relate to an atomizer unit that has a chamber assembly with an injection chamber and an atomizer chamber. The injection chamber is connected to the atomizer chamber by a nozzle, and the atomizer unit has a first feed channel for feeding a first compressed air flow into the injection chamber, a second feed channel for feeding a second compressed air flow into the atomizer chamber, and an injection valve for injecting a coolant and/or lubricant into the first compressed air flow in the injection region of the injection chamber. The first compressed air flow flows from the injection chamber into the atomizer chamber through the nozzle, is atomized in the atomizer chamber by
(Continued)

the nozzle, is combined with the second compressed air flow in the atomizer chamber in order to form a transport flow for transporting the injected coolant and/or lubricant, and can be conducted to the machining location.

20 Claims, 5 Drawing Sheets

(51) Int. Cl.
    *B05B 1/30*         (2006.01)
    *B05B 7/00*         (2006.01)
    *B05B 7/04*         (2006.01)
    *B23Q 11/10*       (2006.01)

(52) U.S. Cl.
    CPC ........ *B05B 7/0475* (2013.01); *B23Q 11/1046* (2013.01); *B23Q 11/1076* (2013.01)

(56) References Cited

U.S. PATENT DOCUMENTS

| | | | | |
|---|---|---|---|---|
| 3,696,889 | A * | 10/1972 | Brake | F16N 7/34 |
| | | | | 184/55.2 |
| 5,226,506 | A * | 7/1993 | Link | F16L 7/02 |
| | | | | 239/419 |
| 6,659,370 | B1 | 12/2003 | Inoue | |
| 9,573,147 | B1 * | 2/2017 | Yeates | A61M 11/001 |
| 10,898,912 | B2 * | 1/2021 | Hoxie | F23D 11/38 |
| 2013/0206441 | A1 * | 8/2013 | Roser | B23Q 11/1046 |
| | | | | 173/199 |
| 2017/0280775 | A1 * | 10/2017 | Manca | A24F 40/485 |
| 2021/0239267 | A1 * | 8/2021 | Lehman | F16N 7/34 |
| 2022/0390067 | A1 * | 12/2022 | Lehman | B05B 1/083 |
| 2023/0020961 | A1 * | 1/2023 | Manca | B05B 7/0012 |

FOREIGN PATENT DOCUMENTS

| | | | |
|---|---|---|---|
| DE | 19842507 | 3/2000 | |
| DE | 19915265 | 6/2000 | |
| DE | 29724651 | 8/2002 | |
| DE | 10222863 | 11/2003 | |
| DE | 10222863 C1 * | 11/2003 | ........... B05B 7/0458 |
| DE | 10310118 | 9/2004 | |
| DE | 102004034689 | 8/2005 | |
| DE | 102005044603 | 4/2006 | |
| DE | 102007008227 | 8/2008 | |
| DE | 202009017656 | 5/2011 | |
| DE | 102015213536 B3 * | 11/2016 | ........... B23B 31/005 |
| DE | 102018111082 | 11/2019 | |
| RU | 2164850 | 4/2001 | |
| RU | 2524871 | 8/2014 | |
| RU | 174875 | 11/2017 | |
| WO | 2021089280 | 5/2021 | |

OTHER PUBLICATIONS

"International Search Report and Written Opinion," for PCT Application No. PCT/EP2020/078788 dated Jan. 21, 2021 (10 pages).
"First Office Action," for Chinese Patent Application No. 202080092158.X dated Apr. 13, 2023 (7 pages) No Translation Available.
"Russian Search Report," for Russian Patent Application No. 2022115157/05(031834) dated Oct. 12, 2022 (2 pages) no translation available.

* cited by examiner

ATOMIZER UNIT

CROSS-REFERENCE TO RELATED APPLICATIONS

This application is a national stage application under 35 U.S.C. 371 of International Patent Application Serial No. PCT/EP2020/078788, entitled "Atomizer Unit," filed Oct. 13, 2020, which claims priority from German Patent Application No. DE 10 2019 130 112.2, filed Nov. 7, 2019, the disclosure of which is incorporated herein by reference.

FIELD OF THE TECHNOLOGY

Various embodiments replate to an atomizer unit of a minimal quantity lubrication system for cooling and/or lubricating a subtractive machining process between a tool and a workpiece at a machining location, to a minimal quantity lubrication system, to a machining system, and to a method for operating an atomizer unit and/or a minimal quantity lubrication system and/or a machining system.

BACKGROUND

In many subtractive machining processes it is advantageous for cooling and/or lubricating to be provided at the machining location between the tool and the workpiece. The process reliability can in most instances be significantly enhanced as a result of such cooling and/or lubricating. The machining quality and the service life of the tool can be increased, and the thermal input into the workpiece can be reduced. At the same time however, the costs for the respective coolant and/or lubricant are also to be kept low, and any unnecessary release of coolant and/or lubricant into the environment is to be avoided. Post machining, cleaning of the workpiece by removing coolant and/or lubricant is ideally also to be avoided. As the size of the workpiece increases, the complexity associated with cleaning significantly increases in particular when said workpiece is only partially machined at many locations. This applies in particular to structural aircraft components in which a plurality of workpiece parts are connected to one another by drilling and riveting. Therefore, so-called minimal quantity lubrication systems have been developed in order for the quantity of coolant and/or lubricant used in the subtractive machining process to be reduced.

Minimal quantity lubrication systems for machining in which the aerosol is generated in a large container and from the latter is guided to the machining location by way of a line are known in principle. These systems are sluggish. The quality of the aerosol, in particular the concentration of the aerosol and the quantity of aerosol to be fed, here can only be slowly varied and cannot be dynamically controlled.

DE 20 2009 017 656 U1 proposes a minimal quantity lubrication system which already permits somewhat more dynamic controlling. In this minimal quantity lubrication system, the coolant and/or lubricant is sprayed into a chamber by way of a high-pressure nozzle and transported to the machining location by means of a compressed air flow. This system can be configured as a single-duct minimal quantity lubrication system in which the aerosol is generated outside the spindle of a machining system and by means of single-duct routing is guided through the spindle and the tool to the machining location. Alternatively, the system can be configured as a dual-duct minimal quantity lubrication system in which the aerosol is generated within the spindle and the spindle is fed compressed air and the coolant and/or lubricant by means of a separate line.

SUMMARY

Nevertheless, there is demand for further optimization in terms of the homogeneity of the aerosol to be produced, the improvement of the response time, and the adjustability of the aerosol quality. This applies in particular to machining systems in which the generation of aerosol in the spindle of said machining system is not possible due to the lack of installation space.

Therefore, the present disclosure is based on the object of improving the homogeneity, the response time, and the adaptation to changing conditions and the quantity of the coolant and/or lubricant to be used, in particular in the case of small spindles.

The object mentioned above in an atomizer unit of a minimal quantity lubrication system is achieved by the features described herein.

The atomizer unit according to the proposal of a minimal quantity lubrication system for cooling and/or lubricating a subtractive machining process between a tool and a workpiece at a machining location has a chamber assembly having an injection chamber and having an atomizer chamber. The injection chamber is connected to the atomizer chamber by a nozzle. The atomizer unit has at least one first infeed duct for feeding a first compressed air flow into the injection chamber, and at least one second infeed duct for feeding a second compressed air flow into the atomizer chamber. Furthermore, the atomizer unit has an injector valve for injecting a coolant and/or lubricant into the first compressed air flow in the injection region of the injection chamber. Said atomizer unit is designed in such a manner that the first compressed air flow, optionally conjointly with the injected coolant and/or lubricant, from the injection chamber flows through the nozzle into the atomizer chamber and therein is atomized by the nozzle. The first compressed air flow, optionally conjointly with the injected coolant and/or lubricant, is united with the second compressed air flow in the atomizer chamber so as to form a transport flow for transporting the injected coolant and/or lubricant. The transport flow can then be directed to the machining location by way of a transmission duct.

The injection of the coolant and/or lubricant into a first compressed air flow, and the flow of the first compressed air flow conjointly with the optionally injected coolant and/or lubricant through the nozzle, and the unification with the second compressed air flow enables a particularly homogenous distribution and low concentration of the coolant and/or lubricant in the transport flow, and in this way a particularly precise and uniform, flexibly adjustable infeed of coolant and/or lubricant to the machining location. A particularly high quality of the aerosol generated by the atomizer unit is achieved. The aerosol quality is moreover further stabilized as a result of the heating being provided.

Therefore, the atomizer unit according to the proposal has a heating which heats the coolant and/or lubricant and/or the first compressed air flow and/or the second compressed air flow and/or the transport flow.

A heated coolant and/or lubricant can be better atomized and thus ensures a further enhanced aerosol quality. Moreover, the reliance of the aerosol quality on environmental influences such as, for example, the ambient temperature, is also reduced. As a result, a high aerosol quality can be achieved even at variable environmental conditions. Moreover, the atomizer unit according to the proposal is also very compact and can therefore be easily integrated in the machining system.

According to some embodiments, the coolant and/or lubricant is in particular heated prior to the injection from the injector valve into the first compressed air flow. This is now possible by way of a particularly minor input of energy, because only a very minor quantity of coolant and/or lubricant in comparison to the quantity of compressed air is fed to the atomizer unit per unit of time.

According to some embodiments, the injector valve is received in an, in particular multiple-part, block. Additionally, the heating and/or a temperature sensor can be disposed in this block. As a result, a particularly positive and uniform transmission of heat to the coolant and/or lubricant can be guaranteed.

A structurally simple and efficient construction is derived when the block forms at least part of the injection chamber, and/or forms at least part of the atomizer chamber, and/or the nozzle is mounted in the block.

In order to enable a very high level of responsiveness, in particular also in terms of adjusting or modifying the cooling/lubricating parameters, the injection chamber and/or the atomizer chamber are/is configured as described herein.

A minor spacing of the nozzle from the injector valve also enables a high aerosol quality and a flexible adjustment of the aerosol.

The nozzle can be configured as described herein. A particularly homogenous aerosol can be generated as a result.

According to some embodiments, the injector valve is a high-pressure injector valve, in particular a gasoline direct-injector valve. This enables a very precise actuation and, correspondingly, a flexible adjustment of the aerosol quality.

In some embodiments, particularly flexible and responsive metering can be achieved with a high level of homogeneity.

Moreover, the object outlined at the outset in a minimal quantity lubrication system can be achieved by the features described herein.

The minimal quantity lubrication system here may have all features described in the context of the atomizer unit individually or in combination. The same advantages as described in the context of the atomizer unit are derived.

Various embodiments relate to operating parameters of the minimal quantity lubrication system. In this range, the minimal quantity lubrication system can be particularly efficiently operated for smaller bores.

Moreover, the object described at the outset in a machining system can be achieved by the features described herein.

The machining system here has the features described in the context of the atomizer unit and/or the minimal quantity system individually and/or in combination. The same advantages as described in the context of the atomizer unit and the minimal quantity lubrication system are derived.

Various embodiments of the machining system are described herein.

Finally, the object discussed at the outset in terms of a method is achieved by the features described herein.

The same advantages as described above in the context of the atomizer unit, the minimal quantity lubrication system and/or the machining system are derived.

An atomizer unit and/or a minimal quantity lubrication system and/or a machining system as described herein can be used in the method.

Various embodiments provide an atomizer unit of a minimal quantity lubrication system for cooling and/or lubricating a subtractive machining process between a tool and a workpiece at a machining location, the atomizer unit having a chamber assembly having an injection chamber and having an atomizer chamber, the injection chamber being connected to the atomizer chamber by a nozzle, the atomizer unit having at least one first infeed duct for feeding a first compressed air flow into the injection chamber, and at least one second infeed duct for feeding a second compressed air flow into the atomizer chamber, the atomizer unit having an injector valve for injecting a coolant and/or lubricant into the first compressed air flow in the injection region of the injection chamber, the atomizer unit being designed in such a manner that the first compressed air flow, optionally conjointly with the injected coolant and/or lubricant, from the injection chamber flows through the nozzle into the atomizer chamber and therein is atomized by the nozzle, the first compressed air flow, optionally conjointly with the injected coolant and/or lubricant, being unified with the second compressed air flow in the atomizer chamber so as to form a transport flow for transporting the injected coolant and/or lubricant and being directable to the machining location, the atomizer unit having a heating which heats the coolant and/or lubricant and/or the first compressed air flow and/or the second compressed air flow and/or the transport flow.

In various embodiments, the heating heats the coolant and/or lubricant prior to being injected from the injector valve into the first compressed air flow.

In various embodiments, the injector valve is received in an, in particular multiple-part, block, in particular metal block, such as in that additionally the heating and/or a temperature sensor are/is disposed in the block, furthermore in that the heating heats the block and the latter heats the coolant and/or lubricant.

In various embodiments, the block forms at least part of the injection chamber, and/or forms at least part of the atomizer chamber, and/or the nozzle is mounted in the block.

In various embodiments, the injection chamber has a volume of at most 10,000 $mm^3$, furthermore of at most 100 $mm^3$, furthermore of at most 500 $mm^3$, furthermore of 250 $mm^3$, and/or wherein the atomizer chamber has a volume of at most 20,000 $mm^3$, furthermore of at most 5000 $mm^3$, furthermore of at most 1000 $mm^3$, furthermore of 750 $mm^3$.

In various embodiments, the nozzle is disposed so as to be spaced apart from the injector valve, in particular the outlet end of the injector valve, by at most 10 cm, at most 5 cm, furthermore at most 3 cm, furthermore at most 1.5 cm.

In various embodiments, the passage opening width of the passage opening of the nozzle is at most 0.5 mm, at most 0.3 mm, furthermore at most 0.2 mm.

In various embodiments, the injector valve is a high-pressure injector valve, in particular a gasoline direct-injector valve.

In various embodiments, the injector valve is actuated in a pulsed manner, in that the opening duration of the injector valve is shorter than the duration between two opening actions of the injector valve.

In various embodiments, the minimal quantity lubrication system having an atomizer unit further has a coolant and/or lubricant source for supplying the injector valve with coolant and/or lubricant, and having a compressed air source assembly for supplying the first and/or second infeed duct with compressed air.

In various embodiments, the coolant and/or lubricant is provided by the coolant and/or lubricant source at a pressure of 50 to 250 bar, of 80 to 220 bar, furthermore of 100 to 200 bar, furthermore of 130 to 170 bar, furthermore of 150 bar, and/or in that compressed air in the case of an established transport flow is provided to the first infeed duct at a pressure of 3 to 8 bar, of 4 to 7 bar, furthermore of 6 bar, and/or in that compressed air in the case of an established transport flow is provided to the second infeed duct at a pressure of 8 to 15 bar, of 9 to 13 bar, furthermore of 11 bar.

Various embodiments provide a machining system for the subtractive machining of a workpiece, the machining system having a tool and an atomizer unit as described herein, and/or a minimal quantity lubrication system as described herein.

In various embodiments, the machining system has a spindle having a tool receptacle, and in that the transmission duct from the atomizer unit to the machining location runs, in particular in a rectilinear manner, through the spindle and the tool.

In various embodiments, the machining system is a drill, in particular a drilling/riveting machine, and in that the tool is a drill bit.

Various embodiments provide a method for operating an atomizer unit, in particular as described herein, and/or a minimal quantity lubrication system, in particular as described herein, and/or a machining system, in particular as described herein, the atomizer unit having a chamber assembly having an injection chamber and having an atomizer chamber, the injection chamber being connected to the atomizer chamber by a nozzle, the atomizer unit having at least one first infeed duct for feeding a first compressed air flow into the injection chamber, and at least one second infeed duct for feeding a second compressed air flow into the atomizer chamber, the atomizer unit having an injector valve for injecting a coolant and/or lubricant into the first compressed air flow in the injection region of the injection chamber, the first compressed air flow, optionally conjointly with the injected coolant and/or lubricant, from the injection chamber flowing through the nozzle into the atomizer chamber and therein being atomized by the nozzle, the first compressed air flow, optionally conjointly with the injected coolant and/or lubricant, being unified with the second compressed air flow in the atomizer chamber so as to form a transport flow for transporting the injected coolant and/or lubricant, and the transport flow being guided through a transmission duct to a machining location, the atomizer unit having a heating which heats the coolant and/or lubricant and/or the first compressed air flow and/or the second compressed air flow and/or the transport flow prior to entering the transmission duct.

BRIEF DESCRIPTION OF THE DRAWINGS

Various aspects will be explained in more detail hereunder by means of a drawing illustrating merely an exemplary embodiment. In the drawing

DETAILED DESCRIPTION

Figure 1:
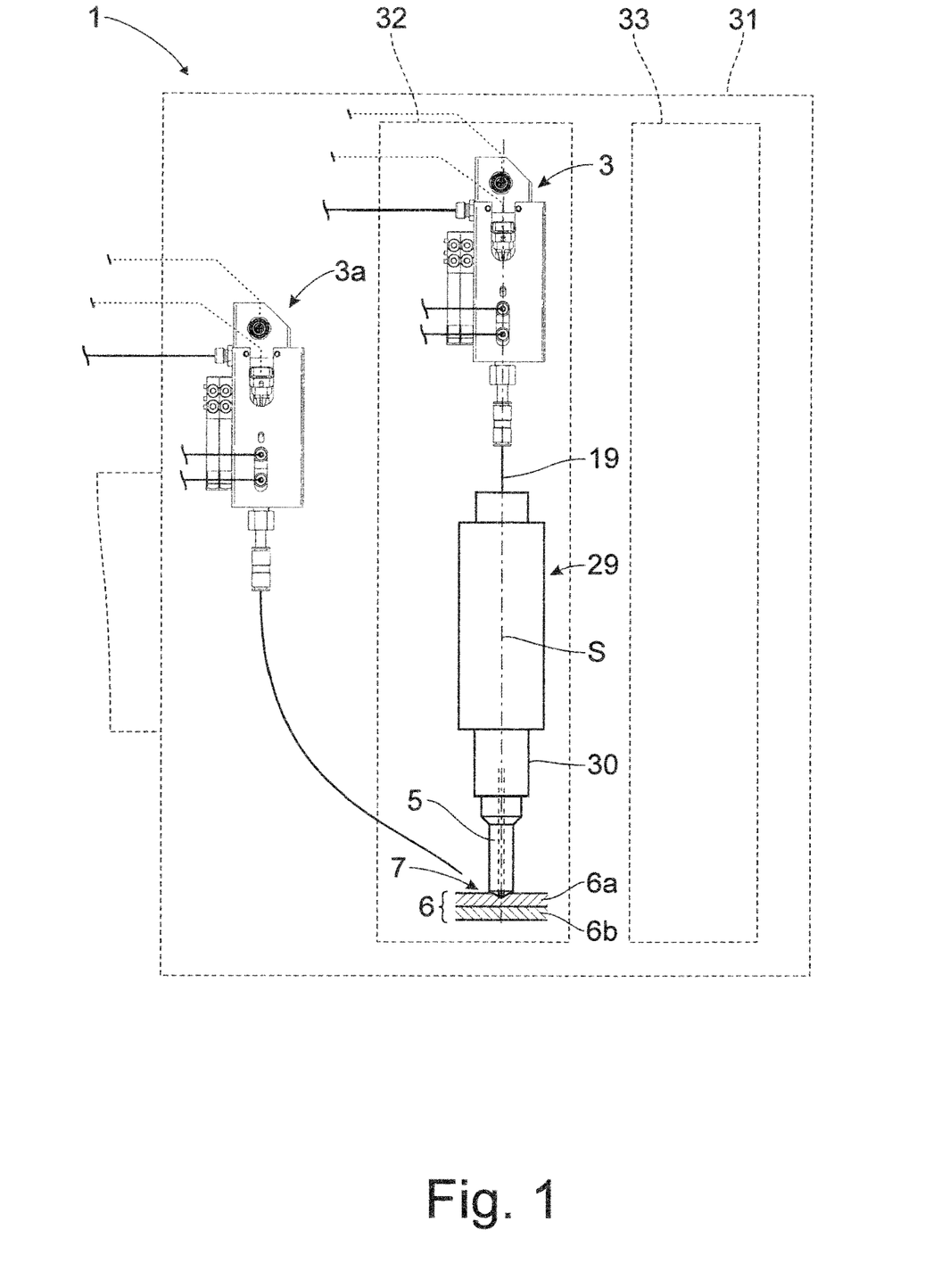
FIG. 1 shows a schematic illustration of a machining system according to the proposal, having an atomizer unit according to the proposal of a minimal quantity lubrication system according to the proposal.

FIG. 1 schematically shows a machining system 1 according to the proposal, having a minimal quantity lubrication system 2 according to the proposal which has an atomizer unit 3 according to the proposal.

Reference is made to the not yet published German patent applications DE 10 2008 111 082.0 and DE 10 2008 111 083.9, reference being made thereto in terms of the further design embodiment and the content of said patent applications being incorporated in this application by reference.

Figure 2:
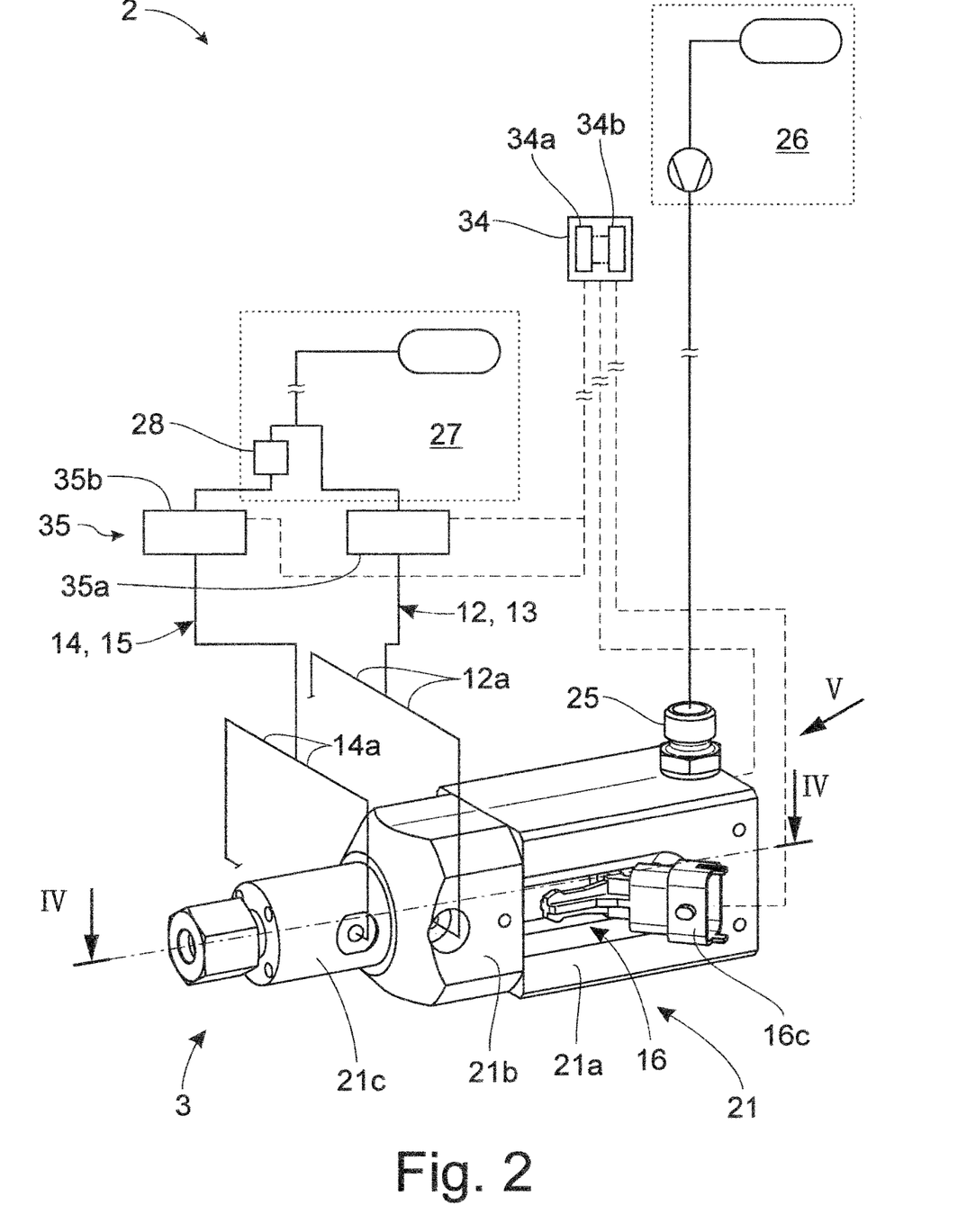
FIG. 2 in a schematic illustration shows an exemplary embodiment of a minimal quantity lubrication system according to the proposal, having the atomizer unit according to the proposal from FIG. 1 in a three-dimensional external view.
Figure 4:
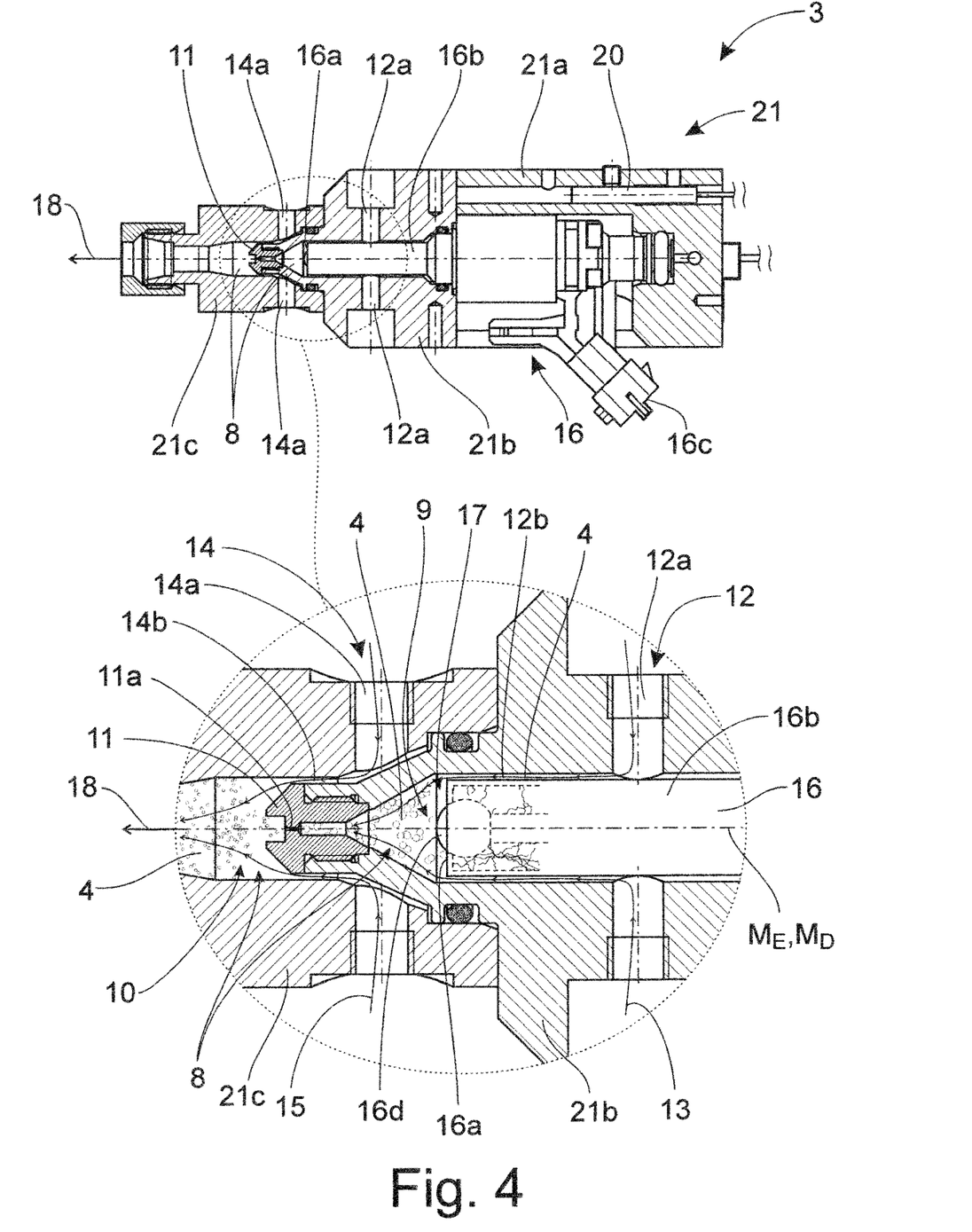
FIG. 4 shows a section through the atomizer unit of the exemplary embodiment according to the view IV-IV from FIG. 2, and an enlarged detailed view of the section.

The functional mode of the atomizer unit 3 is to be explained by means of FIG. 4 which shows the atomizer unit in the section according to IV-IV of FIG. 2.

The atomizer unit 3 serves for providing the coolant and/or lubricant 4 for cooling and/or lubricating a subtractive machining process between a tool 5 and a workpiece 6 at a machining location 7.

The tool 5 can in particular be a subtractive tool, presently as a drill bit. The workpiece 6 presently is a structural component, in particular a structural aircraft component. Structural aircraft components are for example fuselage sections and/or wing sections of an aircraft. The workpiece 6 can be composed of a plurality of workpiece parts 6a, 6b. The latter are conjointly drilled here and subsequently riveted to one another. The workpiece parts 6a, 6b can be configured from a material, and/or as a composite and/or as a hybrid component. A workpiece part can in particular be a metal/fiber composite component which is formed from a plurality of tiers, in particular metal tiers and fibrous tiers. By virtue of the high degree of adjustment flexibility of the various embodiments, the latter can generate an added value specifically in the case of these components.

The atomizer unit 3 according to the proposal has a chamber assembly 8 having an injection chamber 9 and having an atomizer chamber 10, the injection chamber 9 being connected to the atomizer chamber 10 by a nozzle 11. Furthermore, the atomizer unit 3 has at least one first infeed duct 12 for feeding a first compressed air flow 13 into the injection chamber 9, and at least one second infeed duct 14 for feeding a second compressed air flow 15 into the atomizer chamber 10. The atomizer unit 3 according to the proposal also has an injector valve 16 for injecting a coolant and/or lubricant 4 into the first compressed air flow 13 in the injection region 17 of the injection chamber 9.

As is shown in FIG. 4, the atomizer unit 3 here is designed in such a manner that the first compressed air flow 13, optionally conjointly with the injected coolant and/or lubricant 4, from the injection chamber 9 flows through the nozzle 11 into the atomizer chamber and therein is atomized by the nozzle 11. An aerosol is formed as a result.

An aerosol is understood to be a colloid system composed of gas, presently the compressed air, having small solid and/or liquid particles (suspended substances, presently the coolant and/or lubricant) distributed therein. Presently, these are liquid particles. The particles can have diameters from $10^{-7}$ to $10^{-3}$ cm. The coolant and/or lubricant 4 in the exemplary embodiment has a kinematic viscosity of $9 \times 10^{-6}$ m³ per second.

The first compressed air flow 13, optionally conjointly with the injected coolant and/or lubricant 4, in the atomizer chamber 10 unifies with the second compressed air flow 15 so as to form a transport flow 18 for transporting the injected coolant and/or lubricant 4. The transport flow 18 in the exemplary embodiment is directed from the atomizer chamber 10 to the machining location 7 by way of a transmission duct 19. At said machining location 7, the transmission duct 19 directly adjoins the atomizer chamber. The transmission duct presently is distinguished in that the latter is releasable from the atomizer chamber. The transmission duct can in particular be a flexible hose.

The injection of the coolant and/or lubricant 4 into the first compressed air flow 13, and the later adding of a second compressed air flow 15, provided downstream, after the atomization by the nozzle 11 enables a homogenous distribution of the coolant and/or lubricant 4 at a low concentration in the transport flow 18. An aerosol composed of compressed air and coolant and/or lubricant 4 is produced. Furthermore, this constructive design of the atomizer unit 1 enables short response times for activating and deactivating the aerosol for the subtractive machining process. This is particularly advantageous in the case of short subtractive machining processes such as, for example, when drilling, in particular thin multi-layer workpieces 6 or workpiece parts 6a, 6b.

The fact that the atomizer unit 3 according to the proposal has a heating 20 which heats the coolant and/or lubricant 4 and/or the first compressed air flow 13 and/or the second compressed air flow 15 and/or the transport flow 18, in particular prior to exiting the atomizer chamber 10 and/or prior to entering the transmission duct 19, leads to the aerosol being further stabilized. Environmental influences on the aerosol quality, such as temperature variations in the proximity of the machining system 1, can in particular be reduced. As a result, an even more stable, flexible and highly responsive supply of the machining location 7 with coolant and/or lubricant 4 is achieved.

The heating 20 heats the coolant and/or lubricant 4 prior to injection from the injector valve 16 into the first compressed air flow 13 and/or prior to, in particular immediately prior to, entering the injector valve 16, as is also implemented in the exemplary embodiment.

Figure 3:
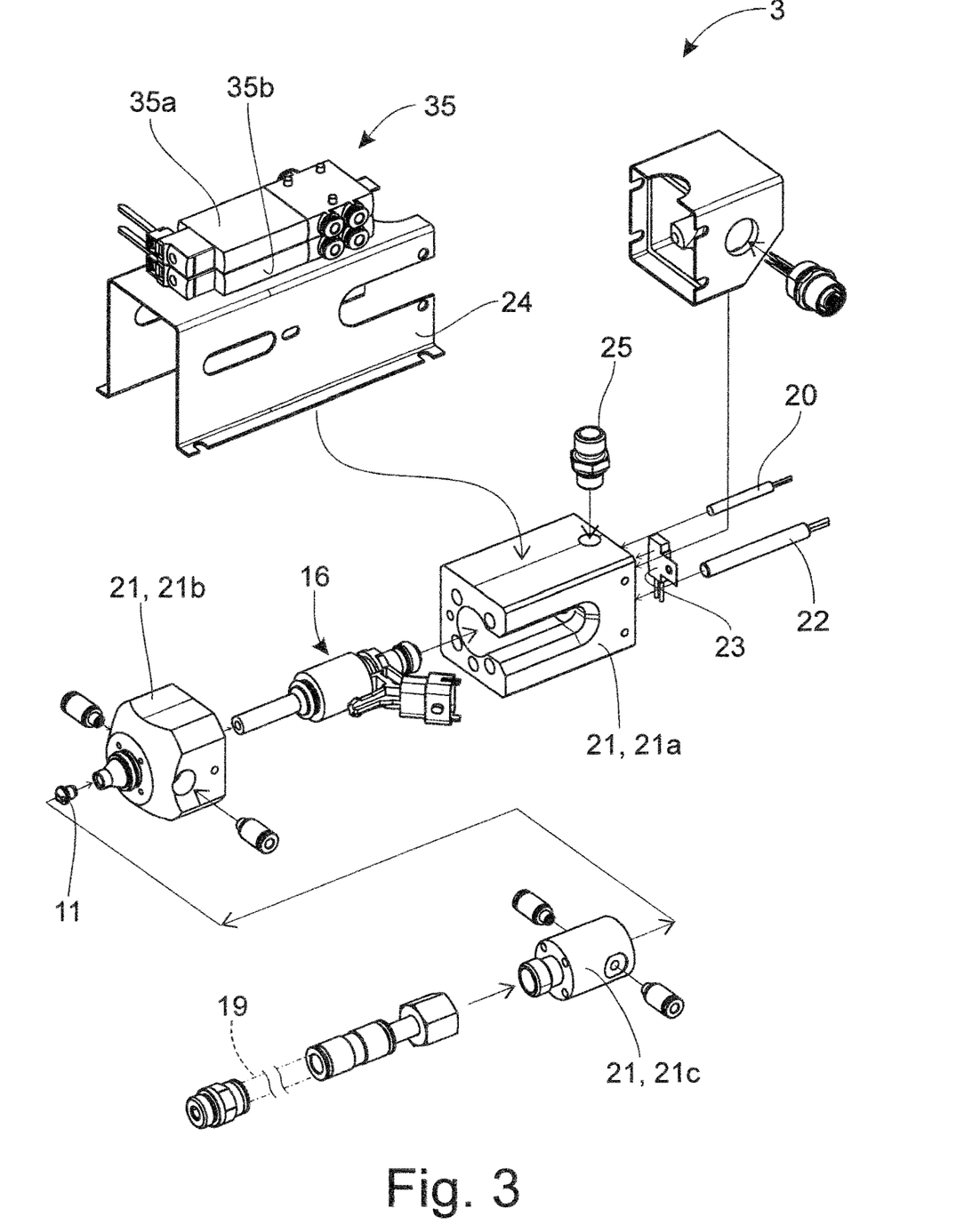
FIG. 3 shows an exploded drawing of the atomizer unit from FIG. 2.

As is shown in FIGS. 2 and 3, the injector valve 16 is received in an, in particular multiple-part, block 21, in particular metal block. The block 21 can be made of steel, in particular stainless steel, and/or aluminum. The heating 20 heats the block 21 and the latter heats the coolant and/or lubricant 4. The injector valve 16 in the exemplary embodiment is received in the block 21 across the entire length of said injector valve 16. The coolant and/or lubricant 4 can be also heated in the injector valve 16.

In addition to the injector valve 16, the heating 20 and/or a temperature sensor 22 are/is presently disposed in the block 21. Furthermore, as is shown in FIG. 3, a temperature limit switch 23 which switches off the heating 20 when a predetermined temperature, such as 90° C., or 80° C., is exceeded can be provided. The heating 20 can be configured as a heating element.

The block 21 in the exemplary embodiment is configured in three parts. However, said block 21 can also be configured in only two parts, for example. The injector valve 16 is at least partially received in a part 21a, 21b, 21c of the multiple-part block 21 (presently in the first block part 21a). The heating 20 and/or the temperature sensor 22 are/is received in the same part of the multiple-part block 21 (presently in the first block part 21a). This is shown in FIG. 3.

In the exemplary embodiment the numbering of the block parts 21a, 21b, 21c ascends in the flow direction. Even when the heating 20 presently is received only in one block part, said heating heats the entire block 21. The block parts in the assembled state here all are in direct contact. Said block parts can be made from the same material.

The temperature sensor 22 presently serves for open-loop control and/or closed-loop control of the heating 20. The heating 20 can be operated in such a manner that said heating 20 controls by closed-loop the block 21 to a substantially constant temperature and/or a temperature curve. The block 21 presently is adjusted to an, in particular substantially constant, temperature between 20° C. and 80° C., furthermore between 30° C. and 70° C., furthermore between 40° C. and 60° C., in the exemplary embodiment 50° C. A particularly efficient thermal transmission to the coolant and/or lubricant 4 is enabled as a result.

The heating 20 can be also adjusted as a function of the viscosity of the coolant and/or lubricant 4 used. For example, in the case of a coolant and/or lubricant 4 having a higher viscosity, the block 21 can be controlled by open-loop or closed-loop to a higher temperature than in the case of a coolant and/or lubricant 4 having a lower viscosity.

Figure 5:
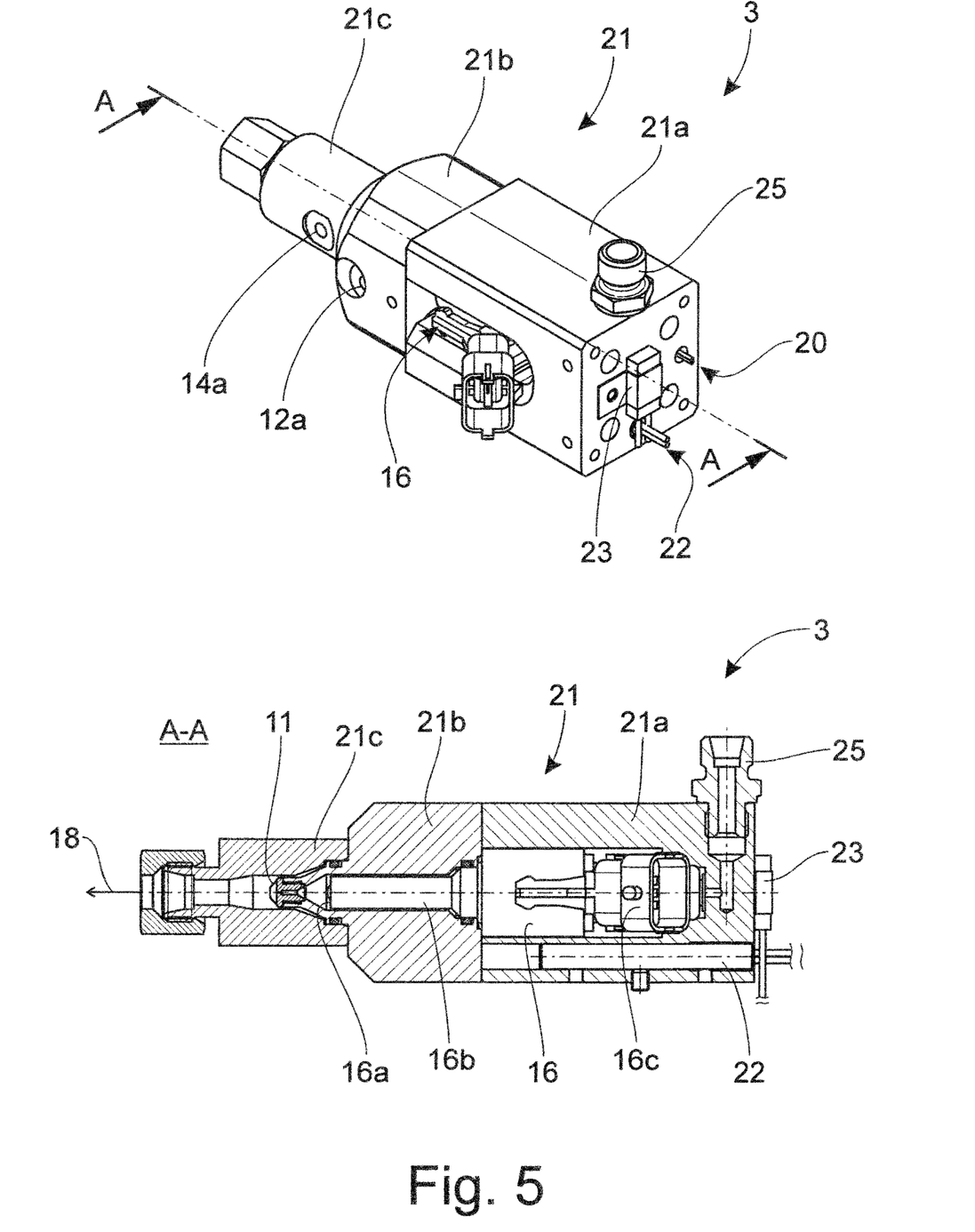
FIG. 5 shows a three-dimensional illustration of the atomizer unit, and a section according to the view A-A.

Furthermore, the temperature limit switch 23 presently is disposed on the same part of the block 21. As is shown in FIG. 5, said temperature limit switch 23 in the exemplary embodiment is disposed on the rear side of the atomizer unit 3.

The atomizer unit 3 furthermore has a cover 24 as a heat shield, the latter being disposed so as to be spaced apart from the block 21. As a result, the block 21 more readily maintains its temperature, on the one hand, and any inadvertent contact with the warm block 21 which could lead to burns is prevented, on the other hand.

As can furthermore be derived from FIG. 3, a second part of the block 21 (second block part 21b) in the exemplary embodiment also partially receives the injector valve 16. The nozzle 11 can be also received in the block 21 and/or configured by the latter. The nozzle 11 in the exemplary embodiment is mounted in the block 21, presently in the second part of the block 21.

It is thus presently the case that the block 21 forms at least part of the injection chamber 9 and/or at least part of the atomizer chamber 10, as is shown in FIG. 4. In the exemplary embodiment the injection chamber 9 is formed by the injector valve 16 and the second block part 21b. Said injection chamber 9 is formed by receiving the outlet end 16a of the injector valve 16 in the second block part 21b. The injection chamber 9 can have a volume of at most 10,000 mm$^3$, furthermore of at most 1,000 mm$^3$, furthermore of at most 500 mm$^3$, in the exemplary embodiment of 250 mm$^3$.

The atomizer chamber 10 is formed by the second and the third block part 21b, 21c, and optionally by the nozzle 11. This is shown in FIG. 4. The atomizer chamber 10 can be larger than the injection chamber 9 by a factor of 2 to 5. The atomizer chamber 10 can have a volume of at most 20,000 mm$^3$, furthermore of at most 5,000 mm$^3$, furthermore of at most 1,000 mm$^3$, and in the exemplary embodiment of 750 mm$^3$.

The nozzle 11 can be spaced apart from the injector valve 16, in particular the outlet end 16a of the injector valve 16, by at most 10 cm, at most 5 cm, furthermore at most 3 cm, furthermore at most 1.5 cm. This is shown in FIG. 4.

It can likewise be derived from FIG. 4 that the first compressed air flow 13 in the exemplary embodiment flows into the atomizer unit 3 by way of a plurality of, presently two, first infeed sub-ducts 12a. The latter, presently opposite one another, lead onward into the block 21, presently the second block part 21b. The first infeed sub-ducts 12a presently in the atomizer unit 3, presently in the block 21 (second block part 2c), are unified so as to form a first overall infeed duct 12b. The infeed of the first compressed air flow 13 to the injection chamber 9 presently takes place in a radially encircling manner about the injector valve 16 or the outlet end 16a of the injector valve 16. At least one directional component of the first compressed air flow 13 when entering the injection chamber 9 runs in the primary injection direction of the coolant and/or lubricant 4. The first compressed air flow 13, immediately prior to entering the injection chamber 9, presently runs substantially parallel to the primary injection direction of the coolant and/or lubricant 4. The primary injection direction in the exemplary embodiment is directed along the central axis ME of the injector valve 16.

The first compressed air flow 13, optionally conjointly with the injected coolant and/or lubricant 4, from the injection chamber 9 flows through the nozzle 11 into the atomizer chamber 10. In the atomizer chamber 10 the coolant and/or lubricant 4 by the nozzle 11 is atomized into the second compressed air flow 14, as is shown in FIG. 4. Said nozzle 11 is disposed downstream of the injection chamber 9. In principle, the coolant and/or lubricant 4 can already be atomized when being injected into the injection chamber 9. Said coolant and/or lubricant 4 presently is, however, at least further atomized in the atomizer chamber 10. In this way, a homogenous aerosol for cooling and/or lubricating the machining process can be generated.

The injected coolant and/or lubricant 4 by the first compressed air flow 13 is forced through the passage opening 11a of the nozzle 11. The first compressed air flow 13 thus conveys the injected coolant and/or lubricant 4 through the nozzle 11 and in this way atomizes said coolant and/or lubricant 4 in the atomizer chamber 10.

The passage opening 11a presently is configured so as to be substantially round. In principle however, said passage opening 11a may have another geometry. The maximum passage opening width of said passage opening 11a presently is at most 0.5 mm, at most 0.3 mm, furthermore at most 0.2 mm.

As is shown in FIG. 4, the second compressed air flow 15 in the exemplary embodiment flows into the atomizer unit 3 by way of a plurality of, presently two, second infeed sub-ducts 14a. The latter, presently opposite one another, lead onward into the block 21, presently the third block part 21c. The first infeed sub-ducts 12a presently in the atomizer unit 3, in particular in the block 21 (third block part 2c), are unified so as to form a second overall infeed duct 14b. The infeed to the atomizer chamber 10 presently takes place in a radially encircling manner about the nozzle 22. At least one directional component of the first compressed air flow 13 when entering the atomizer chamber 10 runs in the longitudinal direction of the passage opening 11a. The second compressed air flow 15, immediately prior to entering the atomizer chamber 10, presently runs substantially parallel to the longitudinal direction of the passage opening 11a. In the case of an established transport flow, the volumetric flow of the second compressed air flow 15 presently is larger than the volumetric flow of the first compressed air flow 13. Furthermore, the volumetric flow of the second compressed air flow 15 is larger than the volumetric flow of the first compressed air flow 13 at least by a factor of 2, furthermore at least by a factor of 5 larger than the volumetric flow of the first compressed air flow 13, furthermore at least by a factor of 10 larger than the volumetric flow of the first compressed air flow 13.

The atomizer unit 3 has a connector 25 for the supply line of the coolant and/or lubricant 4. Said connector 25 presently is provided on the block 21. The coolant and/or lubricant 4 is guided from this connector 25 to the injector valve 16. The coolant and/or lubricant 4 on the way from the connector 25 to the injector valve 16 in the exemplary embodiment is in direct contact with the block 21. As a result, a particularly positive thermal input from the heating 20 into the coolant and/or lubricant 4 is guaranteed. The coolant and/or lubricant 4 can also be further heated in the injector valve 16. The block 21 which absorbs the heat of the heating 20 disposed in said block 21 passes this heat onward to the injector valve 16, and the latter passes said heat onward to the coolant and/or lubricant 4.

The injector valve 16 presently is a high-pressure injector valve, in particular a gasoline direct-injector valve. The latter is known from the automotive sector and has proven to be reliable. The injector valve 16 is electrically actuatable. Said injector valve 16 presently is supplied with a voltage of 48 V. In order to be actuated and/or supplied with voltage, said injector valve 16 has an electrical connector 25. The latter is able to be connected to a control assembly 34. In order for the injector valve 16 to be opened and/or closed, the latter presently has a solenoid and/or a piezo actuator. A closing pin 16d for opening and/or closing the injector valve 16 is moved by means of said solenoid and/or piezo actuator.

The outlet end of the injector valve 16 is configured on the end of an elongate portion 16b. The latter is presently cylindrical. For the purpose of transmitting heat, in particular from the block 21, to the coolant and/or lubricant 4, the elongate portion 16b presently is at least partially, in particular completely, configured from metal.

The electrical connector 16c of the injector valve 16 presently protrudes from the block 21, as is shown in FIG. 2 and/or FIG. 5. Said electrical connector 16c presently protrudes from an opening 21d of the first block part 21a.

It is thus furthermore presently the case that the injector valve 16 is actuated in a pulsed manner. The opening duration of the injector valve 16 here is provided so as to be shorter than the duration between two opening actions of the injector valve 16.

It can in particular be provided that different pulse frequencies can be set for different coolant and/or lubricants 4. The duration between two opening actions of the injector valve 16 can be adjusted, in particular as a function of the viscosity of the coolant and/or lubricant 4. The opening duration of the injector valve 16 during one pulse remains constant here.

In order for the coolant and/or lubricant to be injected, the injector valve 16 can be actuated by way of an actuation frequency of 5 to 100 Hz, 10 to 50 Hz, presently 35 Hz. The opening duration of the injector valve can be less than 10 ms, furthermore less than 2 ms, furthermore less than 1 ms, furthermore less than 0.5 ms, furthermore less than 0.4 ms, and in the exemplary embodiment 0.37 ms.

In the exemplary embodiment, this results in an injection quantity of 29 g of coolant and/or lubricant in the transport air flow per hour.

For switching and/or controlling in a closed loop the first and/or second compressed air flow 13, 15, the minimal quantity lubrication system 2, in particular the atomizer unit 3, has a compressed air valve assembly 35. The compressed air valve assembly presently has a switch valve 35a for switching the first compressed air flow 13 and/or a switch valve 35b for switching the second compressed air flow 15.

The two compressed air flows 13, 15 can be switched in a mutually separate manner. The compressed air valve assembly 35 can be fastened to the cover 24.

FIG. 2 shows the minimal quantity lubrication system 2 according to the proposal. The latter in the exemplary embodiment has the previously described atomizer unit 3. The minimal quantity lubrication system 2 presently is suitable and/or specified to consume in total equal to or less than 50 ml of coolant and/or lubricant per hour during the subtractive machining process. Presently, at most 50 ml, furthermore at most 40 ml, furthermore at most 30 ml, of coolant and/or lubricant are consumed per hour during the subtractive machining process.

Provided is a coolant and/or lubricant source 26 for supplying the injector valve with coolant and/or lubricant 4. The coolant and/or lubricant 4 presently is liquid. Said coolant and/or lubricant 4 presently is provided by the coolant and/or lubricant source 26 at a pressure of 50 to 250 bar, of 80 to 220 bar, furthermore of 100 to 200 bar, furthermore of 130 to 170 bar, presently of 150 bar. Pressures this high enable a positive distribution of the coolant and/or lubricant 4 already when being injected into the injection chamber 9.

The minimal quantity lubrication system 2 furthermore has a compressed air source assembly 27 for supplying the first and/or the second infeed duct 13, 15 with compressed air. A single compressed air source for supplying both infeed ducts 13, 15 with compressed air can be provided. Alternatively however, the compressed air source assembly 27 can also be configured by two separate compressed air sources and a first compressed air source supplies the first infeed duct 12 with compressed air and a second compressed air source supplies the second infeed duct 14 with compressed air. The compressed air can be generated from ambient air.

In the exemplary embodiment the minimal quantity lubrication system 2 has one compressed air source which provides the compressed air for the first compressed air flow 13 and the second compressed air flow 14. For example, a booster 28 can be provided here in the supply line to the first compressed air flow 13, said booster 28 increasing the pressure of the first compressed air flow 13 by way of post-compression. It is thus particularly the case that the first infeed duct 12 is provided with compressed air at a higher pressure than the second infeed duct 14. The pressure differential in the provision of pressure presently is 2 to 8 bar. Furthermore, said pressure differential is 4 to 6 bar, furthermore essentially 5 bar. In the case of an established transport flow 18, the first infeed duct 12 can be provided with compressed air at a pressure of 3 to 8 bar, furthermore 4 to 7 bar, in the exemplary embodiment of 6 bar, and/or in the case of an established transport flow 18 the second infeed duct 14 is provided with compressed air at a pressure of 8 to 15 bar, furthermore 9 to 13 bar, presently 11 bar. The pressure of the first compressed air flow 13 and of the second compressed air flow 15 can be adjusted separately from one another.

The machining system 1 according to the proposal, as is shown in FIG. 1, has a tool 5 and a minimal quantity lubrication system 2 having an atomizer unit 3. The machining system 1 has a spindle 29 having a tool receptacle 30 for receiving the tool 5. The machining system 1 here has an end effector 31 in which the spindle 29 is disposed. The compressed air source assembly 27 and/or the coolant and/or lubricant source 26 here is presently disposed so as to be spaced apart from the end effector 31. The atomizer unit 3 in turn is disposed on the end effector 31.

The machining system 1 can be a drill, presently a drilling/riveting machine. The tool 5 in the exemplary embodiment is a drill bit. The spindle 29 presently is a component part of a drilling unit 32 of the end effector 31. The end effector 31 can additionally have a riveting unit 33 for placing rivet elements in a bore drilled by the drilling unit 32.

Moreover, the machining system 1 has a control assembly 34 for controlling the machining system 1 and the minimal quantity lubrication system 2, and thus the subtractive machining process. The control assembly 34 presently has a machining system controller 34a and optionally a minimal quantity lubrication system controller 34b. The machining system controller 34a can be a PLC controller. The latter controls the subtractive machining process. The minimal quantity lubrication system controller 34b presently receives from the machining system controller 34a parameters for controlling the minimal quantity lubrication system 2. The minimal quantity lubrication system 2, in particular the atomizer unit 3 of the minimal quantity lubrication system 2, is controlled as a function of these parameters. This takes place in particular by adding the coolant and/or lubricant 4 by means of the injector valve 16, as well as by way of switching the transport flow 18 and/or the temperature adjustment of the heating 20.

As is shown in FIG. 1, the atomizer unit 3 presently is disposed outside the spindle 29. This is necessary in particular in the case of small and compact spindles 29. A disposal of the atomizer unit 3 in the spindle 29 here is specifically not possible in most instances due to the lack of installation space. The transmission duct 19 presently runs from the atomizer unit 3 through the spindle 29 and through the tool 5 to the machining location 7.

The atomizer unit 3 in the flow direction of the transport flow 18 is disposed ahead of the spindle 29. The flow path from the atomizer unit 3 to the spindle 29 can be less than 50 cm, furthermore less than 20 cm, furthermore less than 10 cm. The closer the atomizer unit 3 is to the spindle 29, the shorter the latency periods for activating and/or deactivating the aerosol can be achieved.

It is thus the case that the spindle axis S intersects the injector valve 16 and/or the nozzle 11. Furthermore, the spindle axis S is disposed so as to be coaxial with the central axis ME of the injector valve 16 and/or with the central axis MD of the nozzle 11. This enables the aerosol to be particularly positively guided in the transmission duct 19. Alternatively, the spindle axis S and the central axis ME and/or the central axis MD can also be disposed so as not to be coaxial. In this instance, said axes can be configured so as to be mutually parallel, or the intersection point thereof can be disposed so as to be spaced apart from the atomizer unit 3 by at most 20 cm, furthermore at most 10 cm.

Additionally or alternatively, an atomizer unit 3a from which a transmission duct 19a is routed to the machining location 7 so as to bypass the tool can be provided, as is shown in FIG. 1. This additional or alternative atomizer unit 3a can be configured as described. In the case of two atomizer units 3, 3a, both can be supplied by means of the same compressed air source assembly 27 and/or coolant and/or lubricant source 26. Presently, both are controlled by the same control assembly 34, the two atomizer units 3, 3a being able to be controlled in an open loop and/or closed loop by separate minimal quantity lubrication system controllers or by the same minimal quantity lubrication system controller 34b.

The subtractive machining process is to be described in more detail hereunder. It can be that for the transport flow 18 to be established before or during a subtractive machining process, and for the coolant and/or lubricant 4 to be added in the established transport flow so as to, conjointly with the transport flow 18, form an aerosol.

The aerosol in this instance can be transported in a particularly simple manner by the transport flow 18 to the machining location 7. Establishing the transport flow 18 prior to injecting the coolant and/or lubricant 4 enables the addition of the coolant and/or lubricant 4 and the transport of the latter to the machining location 7 to be very precisely controlled and thus the cooling and/or lubricating at the machining location 7 to be very precisely controlled. As a result, minor quantities of coolant and/or lubricant 4 can be used exactly at the points in time at which the coolant and/or lubricant 4 are/is actually required or advantageous.

In the exemplary embodiment, the coolant and/or lubricant 4 is added only once a constant transport flow 18 has been established, thus when the transport flow 18 has been configured so as to be quasi-stationary. This enables the period of time after which the aerosol upon actuation of the injector valve 16 for injecting the coolant and/or lubricant 4 exits the at least one exit opening of the tool 5 to be very precisely determined. It can be that for the coolant and/or lubricant 4 to be added to the transport flow 18 in such a manner that the aerosol exits the at least one exit opening only once at least one exit opening of the tool 5 is submerged, in particular completely submerged, in the workpiece 6.

The minimal quantity lubrication system 2 can be adjusted and/or provided with parameters, in particular by an operator, for a workpiece 6 and/or a workpiece part 6a, 6b, in particular for each position of the workpiece 6 and/or of a workpiece part 6a/6b, in the subtractive machining process. As a result, the cooling and/or lubrication can be adapted for different positions, in particular each position, of the workpiece 6 or the workpiece part 6a, 6b. Adjusting and/or providing parameters presently takes place prior to the start of the subtractive machining process.

The pressure of the transport flow 18, in particular the pressure of the first compressed air flow 13 and/or of the second compressed air flow 15, and the quantity of coolant and/or lubricant used, can be adjustable and/or able to be provided with parameters, in particular by the operator. Adjusting and/or providing parameters presently takes place prior to the start of the subtractive machining process. The pressure of the second compressed air flow 15 is presently provided with parameters by the operator, on the one hand, and the control assembly 34, in particular the minimal quantity lubrication system controller 34b, adjusts the first and the second compressed air flow 13, 15 based on the parameters provided for the second compressed air flow 15. Additionally or alternatively, the operator can provide parameters for the quantity of coolant and/or lubricant. The control assembly 34, in particular the minimal quantity lubrication system controller 34b, presently adjusts the pressure of the coolant and/or lubricant 4 and/or the actuation of the injector valve 16 based on the parameters provided for the quantity of coolant and/or lubricant. The adjustment of the actuation of the injector valve 16 presently takes place by determining the actuation frequency and/or the opening duration and/or a transient which describes a flutter status of the injector valve 16. This can be adjusted by the operator.

The control assembly 34 provides different opening durations of the injector valve 16 as a function of the viscosity of the currently used coolant and/or lubricant 4.

In the subtractive machining process for a first tier of the workpiece the cooling and/or lubrication can in particular be adjusted differently from a second tier of the workpiece 6. Additionally or alternatively, the adding of coolant and/or lubricant 4 can be deactivated for individual tiers of the workpiece 6, in particular when said tiers are made of a fiber-composite material, in particular of a carbon-fiber-reinforced plastic (CFRP).

At the end of the subtractive machining process, in particular once a hole has been drilled, the first compressed air flow 13 and the second compressed air flow 15 can be activated when the tool 5 is being retracted from the workpiece 6, without coolant and/or lubricant 4 being injected. This takes place for at least 150 ms, furthermore at least 200 ms, furthermore at least 250 ms. As a result, the surface of the workpiece 6 can be cleaned when the tool 5 is being extracted, and/or remnants of coolant and/or lubricant 4 can be blown out of the transmission duct 19 and/or of the atomizer unit 3.

The machining system 1, in particular the minimal quantity lubrication system 2, here can monitor the flow of aerosol and/or the concentration of aerosol. Furthermore, said machining system 1, or said minimal quantity lubrication system 2, based on this monitoring can intervene so as to control the subtractive machining process in a closed loop and/or open loop, in particular in that said machining system 1, or said minimal quantity lubrication system 2, adapts parameter settings of the minimal quantity lubrication system 3.

The monitoring can take place directly and/or indirectly. For example, the monitoring can take place indirectly by monitoring the consumption of coolant and/or lubricant and/or the first compressed air flow 13 and/or the second compressed air flow 15.

The monitoring can take place directly, for example, by means of a sensor, in particular a laser sensor, in the transmission duct 19.

The invention claimed is:

1. An atomizer unit of a minimal quantity lubrication system for cooling and/or lubricating a subtractive machining process between a tool and a workpiece at a machining location, the atomizer unit comprising a chamber assembly comprising an injection chamber and comprising an atomizer chamber, the injection chamber being connected to the atomizer chamber by a nozzle, the atomizer unit comprising at least one first infeed duct for feeding a first compressed air flow into the injection chamber, and at least one second infeed duct for feeding a second compressed air flow into the atomizer chamber, the atomizer unit comprising an injector valve for injecting a coolant and/or lubricant into the first compressed air flow in the injection region of the injection chamber, the atomizer unit being designed in such a manner that the first compressed air flow, from the injection chamber flows through the nozzle into the atomizer chamber and therein is atomized by the nozzle, the first compressed air flow being unified with the second compressed air flow in the atomizer chamber so as to form a transport flow for transporting the injected coolant and/or lubricant and being directable to the machining location, the atomizer unit comprising a heating which heats the coolant and/or lubricant and/or the first compressed air flow and/or the second compressed air flow and/or the transport flow.

2. The atomizer unit as claimed in claim 1, wherein the heating heats the coolant and/or lubricant prior to being injected from the injector valve into the first compressed air flow.

3. The atomizer unit as claimed in claim 1, wherein the injector valve is received in a block.

4. The atomizer unit as claimed in claim 3, wherein the block forms at least part of the injection chamber, and/or forms at least part of the atomizer chamber, and/or the nozzle is mounted in the block.

5. The atomizer unit as claimed in claim 3, wherein the block comprises metal.

6. The atomizer unit as claimed in claim 5, wherein the heating and/or a temperature sensor are/is disposed in the block.

7. The atomizer unit as claimed in claim 6, wherein the heating heats the block and the block heats the coolant and/or lubricant.

8. The atomizer unit as claimed in claim 1, wherein the injection chamber has a volume of at most 10,000 mm$^3$, and/or
wherein the atomizer chamber has a volume of at most 20,000 mm$^3$.

9. The atomizer unit as claimed in claim 1, wherein the nozzle is disposed so as to be spaced apart from the injector valve by at most 10 cm.

10. The atomizer unit as claimed in claim 1, wherein the passage opening width of the passage opening of the nozzle is at most 0.5 mm.

11. The atomizer unit as claimed in claim 1, wherein the injector valve is a high-pressure injector valve.

12. The atomizer unit as claimed in claim 1, wherein the injector valve is actuated in a pulsed manner.

13. A minimal quantity lubrication system comprising an atomizer unit as claimed in claim 1, comprising a coolant and/or lubricant source for supplying the injector valve with coolant and/or lubricant, and comprising a compressed air source assembly for supplying the first and/or second infeed duct with compressed air.

14. The minimal quantity lubrication system as claimed in claim 13, wherein the coolant and/or lubricant is provided by the coolant and/or lubricant source at a pressure of 50 to 250 bar,
and/or
in that compressed air in the case of an established transport flow is provided to the first infeed duct at a pressure of 3 to 8 bar,
and/or
in that compressed air in the case of an established transport flow is provided to the second infeed duct at a pressure of 8 to 15 bar.

15. The minimal quantity lubrication system as claimed in claim 13, wherein the coolant and/or lubricant is provided by the coolant and/or lubricant source at a pressure of 130 to 170 bar,
and
in that compressed air in the case of an established transport flow is provided to the first infeed duct at a pressure of 4 to 7 bar,
and
in that compressed air in the case of an established transport flow is provided to the second infeed duct at a pressure of 9 to 13 bar.

16. A machining system for the subtractive machining of a workpiece, the machining system comprising a tool and an atomizer unit as claimed in claim 1.

17. The machining system as claimed in claim 16, wherein the machining system comprises a spindle comprising a tool receptacle, and wherein the transmission duct from the atomizer unit to the machining location runs through the spindle and the tool.

18. The machining system as claimed in claim 16, wherein the machining system is a drill and wherein the tool is a drill bit.

19. The atomizer unit as claimed in claim 1, wherein the injector valve is received in a multiple-part metal block.

20. A method for operating an atomizer unit, and/or a minimal quantity lubrication system, and/or a machining system,
the atomizer unit comprising a chamber assembly comprising an injection chamber and comprising an atomizer chamber, the injection chamber being connected to the atomizer chamber by a nozzle,
the atomizer unit comprising at least one first infeed duct for feeding a first compressed air flow into the injection chamber, and at least one second infeed duct for feeding a second compressed air flow into the atomizer chamber,
the atomizer unit comprising an injector valve for injecting a coolant and/or lubricant into the first compressed air flow in the injection region of the injection chamber,
the first compressed air flow from the injection chamber flowing through the nozzle into the atomizer chamber and therein being atomized by the nozzle,
the first compressed air flow being unified with the second compressed air flow in the atomizer chamber so as to form a transport flow for transporting the injected coolant and/or lubricant, and the transport flow being guided through a transmission duct to a machining location, the atomizer unit comprising a heating which heats the coolant and/or lubricant and/or the first compressed air flow and/or the second compressed air flow and/or the transport flow prior to entering the transmission duct.

* * * * *